United States Patent [19]
Tilton

[11] 4,081,261
[45] Mar. 28, 1978

[54] APPARATUS AND METHOD FOR COOLING A GLASS RIBBON FORMING CHAMBER

[75] Inventor: Robert L. Tilton, Wexford, Pa.

[73] Assignee: PPG Industries, Inc., Pittsburgh, Pa.

[21] Appl. No.: 776,021

[22] Filed: Mar. 9, 1977

[51] Int. Cl.² .............................................. C03B 18/02
[52] U.S. Cl. ................................... 65/65 A; 65/99 A; 65/182 R; 65/356
[58] Field of Search ................ 65/65 A, 99 A, 182 R, 65/356

[56] References Cited
U.S. PATENT DOCUMENTS

| 3,645,713 | 2/1972 | Brichard | 65/99 A |
| 3,770,407 | 11/1973 | Lawrenson | 65/99 A |
| 3,930,828 | 1/1976 | Kunkle | 65/65 A |
| 3,954,432 | 5/1976 | Hummel et al. | 65/99 A |

*Primary Examiner*—Arthur D. Kellogg
*Attorney, Agent, or Firm*—E. Kears Pollock

[57] ABSTRACT

Direct communication is provided between a pool of molten metal in a glass forming chamber and coolers embedded within a refractory bottom liner of the chamber in order to provide for an enhanced rate of cooling along a path of glass advance through such a chamber.

6 Claims, 4 Drawing Figures

APPARATUS AND METHOD FOR COOLING A GLASS RIBBON FORMING CHAMBER

BACKGROUND OF THE INVENTION

1. Field of the Invention

This invention relates to an apparatus and method for the manufacture of a continuous sheet of glass wherein the glass is supported by a pool of molten metal while it is cooled and formed. More particularly, this invention relates to an improved apparatus and method for enhancing the rate at which glass is cooled as it advances along the surface of the molten metal during forming.

2. Description of the Prior Art

It is well known that molten glass may be delivered as a layer onto a pool of molten metal and then be cooled and formed while being advanced thereon to make a continuous sheet or ribbon of glass according to the teachings of Heal, U.S. Pat. No. 710,357; of Hitchcock, U.S. Pat. No. 789,911, of Pilkington; U.S. Pat. No. 3,083,551; or of Edge and Kunkle, U.S. Pat. No. 3,843,346. It also is well known that the cooling of glass during its advance along the surface of a pool of molten metal may be accomplished and controlled by the transfer of heat from the advancing glass to its supporting pool of molten metal and then through the bottom of the chamber or container holding the molten metal to coolers embedded in it or to external cooling surrounding it. For example, U.S. Pat. No. 3,645,713 illustrates a glass forming chamber having a refractory floor with passageways in it which communicate with openings in different regions of the chamber floor so that the liquid or molten metal can be circulated between those regions to regulate the temperature within the pool or bath of molten metal as desired. It is also known to employ a float forming chamber having bottom cooling beneath the casing of the chamber so heat transfer may be accomplished through the refractory liner and casing to the outside environment by maintaining a sufficiently low casing temperature due to the illustrated external cooling. U.S. Pat. No. 3,930,828 illustrates a glass forming chamber having coolers embedded in the refractory liner beneath a glass-supporting pool of molten metal. Heat transfer is established from the supported glass to the glass-supporting pool of molten metal and then through the overlying portion of refractory to the coolers embedded in the refractory liner.

The last-mentioned patent to Kunkle is particularly directed to a method and apparatus for controlling thermal conditions in a glass forming chamber in a way that permits the construction and operation of a relatively short glass forming chamber. However, experience indicates that sufficient cooling to suitably form glass in a short forming chamber on the order of one-fifth to one-tenth the length of a conventional float glass forming chamber requires heat transfer at rates which exceed the rates conveniently encountered when employing embedded coolers alone or when employing external bottom casing coolers alone. It would be possible to provide coolers simply submerged within a pool of molten metal, but such coolers would inherently act as barriers to the free circulation of the glass-supporting molten metal. Locations which may be ideally suited for cooler locations might not be the same locations which would be ideal for barrier locations. Therefore, it has been desired to develop a suitable apparatus for cooling glass by heat transfer through its supporting pool of molten metal which would provide heat transfer efficiencies approaching those for submerged coolers, yet providing for the free, unconstrained flow of pool of molten metal within the immediate region of influence of such coolers. The present invention is believed to provide such an apparatus.

SUMMARY OF THE INVENTION

A glass forming facility comprising an enclosed forming chamber having a casing with a refractory liner containing a pool of glass-supporting molten metal has a cooler extending through a portion of the refractory liner. The liner is provided with an opening extending through a portion of it which provides communication between the pool of molten metal and the cooler. The opening extends downwardly through the uppermost portion of the refractory liner disposed in the bottom of the chamber beneath the pool of molten metal and is of sufficient width and depth to permit molten metal to fill it and surround a cooler extending through the opening at its lower portion.

The relative sizes of the width and depth of the opening may be selected to provide for some thermally-induced circulation into and from the opening, although this is largely inhibited by the fact that the lower portion is and will generally be cooler than the upper portion during operation. Alternatively, the relative sizes of the width and depth of the opening may be such as to substantially prevent the circulation of molten metal to and from it, in which instance heat transfer to the cooler will be primarily by conduction. If circulation of molten metal is inhibited in the opening, the metal will be solidified inside the opening where it is in contact with the cooler, provided there is sufficient cooling. So long as the cooling and solidification of metal is accomplished at a rate to prevent the development of a significant cavity between the cooler and the solidified metal, conductive heat transfer through the solidified metal to the cooler will be good. It appears that for a cavity on the order of no more than 1/64 inch (0.4 mm) thick (as an annular cavity about a cylindrical cooler having an outside diameter of about 1 inch — 2.54 cm) that excellent heat transfer may be achieved through a solidified mass of metal substantially filling the opening and in contact with molten metal only at the upper end of the opening.

In a preferred embodiment of this invention, the width of the opening or slot is from about 0.05 to 1.5 times the width of the cooler at the bottom of the slot in the liner and the depth of the slot measured from the inner surface of the refractory liner to the top of the cooler opening is from 2 to 50 times the width of the slot. The cooler preferably extends across the width of the forming chamber with the cooler having a length sufficient to extend through openings in the side casings of the chamber for connection to an external source and sink for coolant. Where the cooler passes through a side casing an appropriate sealing arrangement, such as an "O" ring compression seal, is provided to prevent the ingress of air from the outside atmosphere into the forming chamber around the cooler. The opening in the refractory liner, which provides communication between the pool of molten metal contained in it and the cooler, is preferably a slot aligned in a direction along the length of the cooler across a portion of the width of the forming chamber. Preferably, the slot does not extend fully to the side walls of the forming chamber. This insures that thermal insulation is provided by the refractory liner between the molten metal inside the refractory liner and the space immediately surrounding the cooler along both margins of the forming chamber. This insures that molten metal entering that space through the opening will be solidified adjacent the cooler in the marginal portions to provide a seal against the leakage of molten metal around the cooler and through its seal where it passes through the side casing. The coolers employed in the practice of this invention may be constructed of any convenient material which is resistant to corrosion by molten metal at the temperatures experienced during use. Since the molten metal employed is preferably tin or a high-tin content alloy, the following materials of construction are considered suitable for coolers employed in this invention: iron, steel, tungsten, molybdenum, iron or steel sheathed with tungsten, molybdenum or tungsten-molybdenum alloy. Any material which can be maintained in a molten tin environment when kept relatively cool may be employed. A preferred cooler simply comprises a pipe such as a Schedule 80, stainless steel pipe which will withstand extended exposure to the tin under the anticipated temperatures of operation.

This invention may be further understood with reference to the drawings in which common reference numerals indicate common or equivalent elements.

DESCRIPTION OF THE PREFERRED EMBODIMENTS

Figure 1:
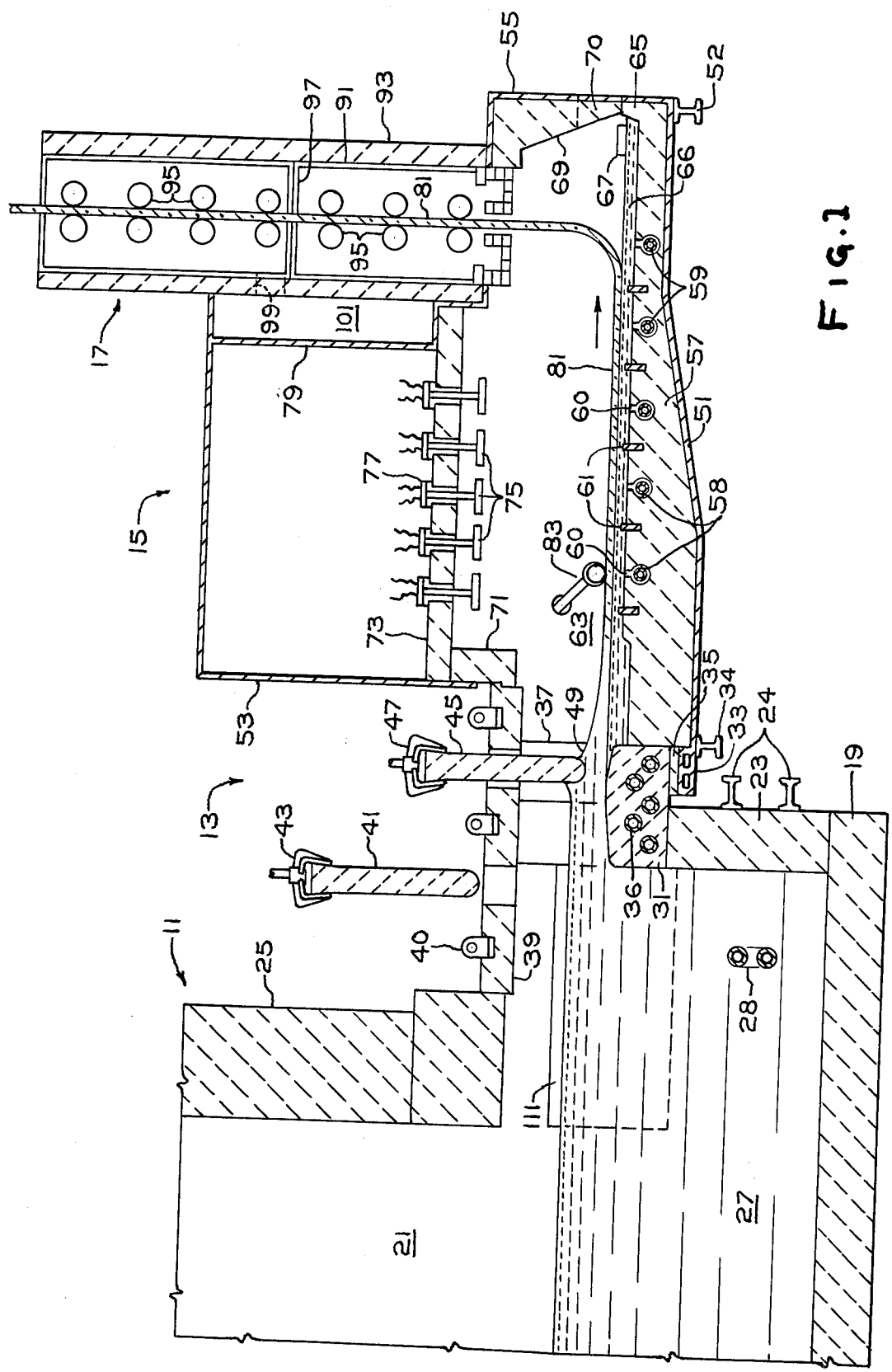
FIG. 1 is a longitudinal, sectional elevation view of a short forming chamber. The particular embodiment illustrated is one having a vertical glass lift-off facility.
Figure 2:
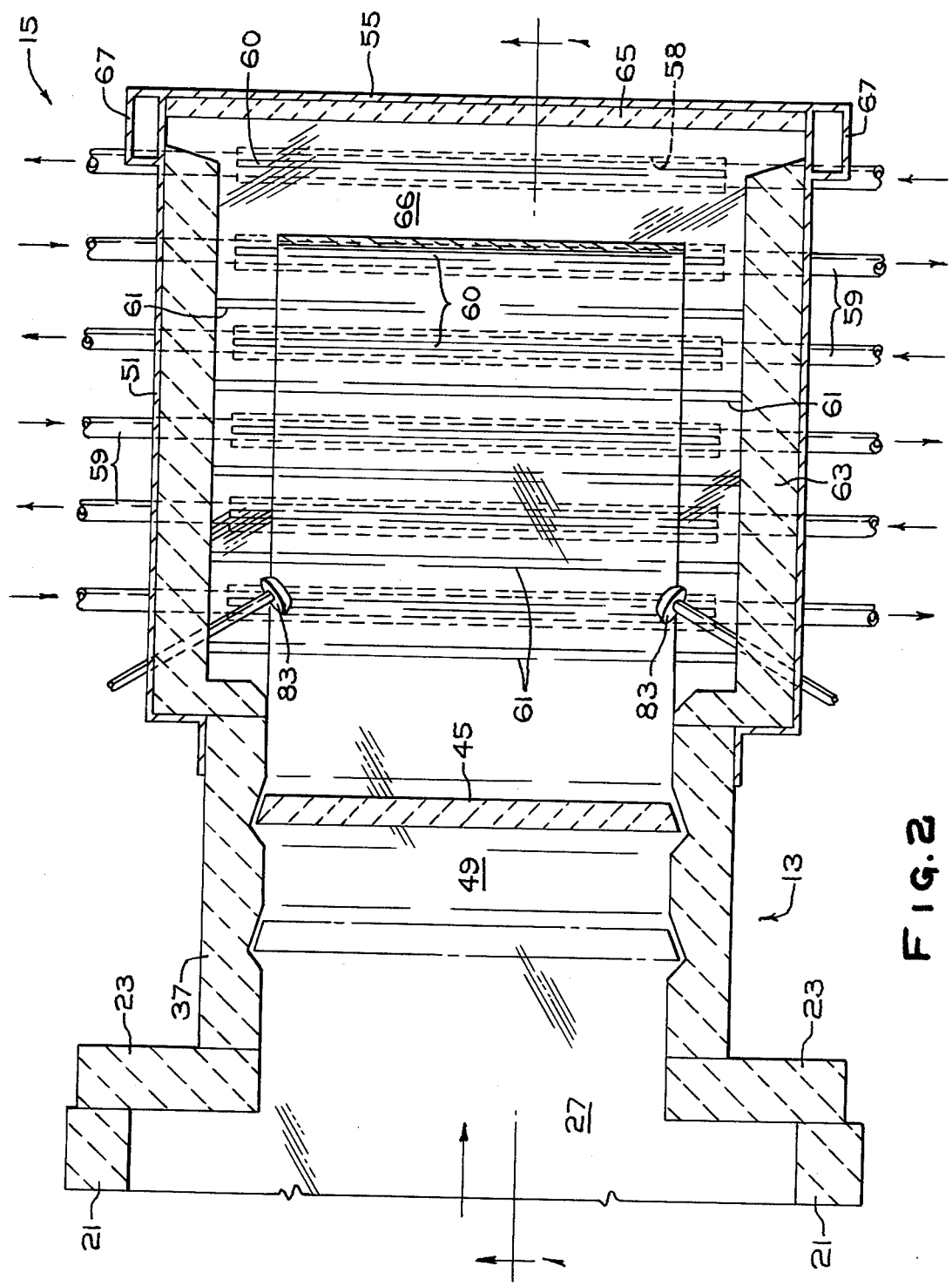
FIG. 2 is a sectional plan view of the forming chamber illustrated in FIG. 1.
Figure 3:
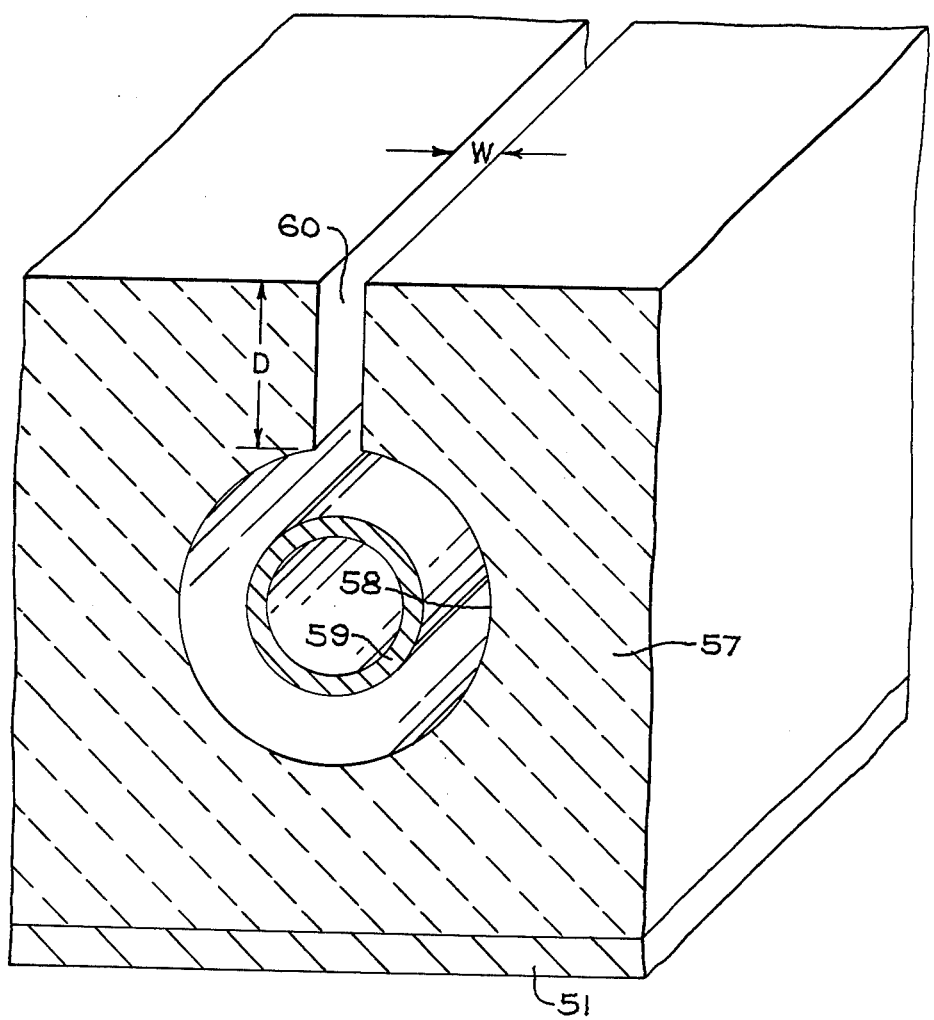
FIG. 3 is an enlarged partial, sectional elevation in perspective illustrating details of the invention.

Referring first to FIGS. 1 and 2, there are shown two views of suitable apparatus for carrying out the present invention. A detailed view of the particular improvement made to the apparatus for enhancing the rate of heat transfer from glass-supporting molten metal to a cooler is illustrated in FIG. 3. The illustrated glassmaking apparatus generally comprises a glassmaking furnace terminating in a refiner or conditioner 11, a molten glass delivery facility 13, a glass forming chamber 15, and a facility 17 for withdrawing a finished ribbon or sheet of glass from the glass forming chamber, which in the illustrated embodiment is a vertical conveyer.

The glassmaking furnace includes a melting section (not shown) and a refiner or conditioner 11, the end of which is shown. The refiner or conditioning end of the furnace includes a furnace bottom 19, side walls 21 and a front basin wall 23. The front basin wall is maintained in position by structural members 24 in the embodiment illustrated. The furnace further comprises an upper front wall 25, which is preferably suspended or supported from above and a roof or crown overlying the upper portion of the furnace, the roof not being shown.

The delivery facility 13 includes a threshold 31 which preferably rests on a cooler or cooling block 33 or upon some other support which is supported by a structural member such as structural member 34. An impervious seal 35 of cast refractory, refractory sheet material or the like is disposed between the threshold and the cooling box. The threshold may be provided with a vertical cooler extending up through it (but not illustrated) for providing an impervious, positive containment casing about the forming chamber side of the threshold.

The threshold 31 is preferably provided with means for controlling its temperature and the temperature of molten glass passing over it. In the embodiment illustrated, coolant pipes or conduits 36 extend through holes in the threshold 31 extending throughout the length of the threshold (that is, transversely across the width of the delivery facility). The coolant conduits or pipes 36 provide for transporting a coolant such as water through the interior of the threshold 31 and thereby controlling its temperature during use.

At the ends of the threshold 31 there are side wall portions or jambs 37 which constrain molten glass being delivered through the facility to a channel defined by the jamb 37 or threshold 31. During operation, a pool of molten glass 37 is maintained in the furnace 11 from which glass is delivered over the threshold. Spaced above the threshold 31 of the delivery facility 13 is a roof 39 generally of flat arch construction, which may be supported from above by supporting means (not shown) extending over it and connected to it by flat arch holders 40 embedded in the flat arch itself.

Extending transversely across the delivery facility 13 are two metering members or tweels. A backup tweel 41 is connected to a support assembly 43 (not fully shown) for raising and lowering it into engagement with molten glass in the pool of molten glass 27. A second tweel is a control 45 supported by a support assembly 47 (not fully shown) for raising and lowering it into contact with a layer of molten glass passing over the threshold 31. Control tweel 45 serves to adjust and maintain a desired opening defined by the bottom of the tweel 45, the inside faces of the side members or jambs 37 and the upper glass-supporting face of the threshold 31. In this way the rate of delivery of molten glass from the furnace to the forming chamber is controlled.

The forming chamber 15 includes a bottom casing 51 supported in part by structural support members 34 and 52. This casing 51 is preferably a casing constructed of an impervious material, such as a metal casing made of steel, for example. The forming chamber 15 further comprises a top or upper casing 53 and an end casing 55. The combination of casings provides a substantially enclosed chamber into which outside air cannot readily enter. Disposed within the bottom casing 51 is a refractory bottom liner 57.

A plurality of transverse openings 58 for accepting transverse coolers 59 are provided through the bottom liner 57. The illustrated coolers 59 are pipes. The coolers 59 reside in openings 58 which extend transversely across the width of the forming chamber at discrete locations along its length. The locations are selected to provide particularly desired thermal regulation or cooling patterns along the path of glass advance through the forming chamber. A plurality of slot-like openings 60 extending partially transversely across the width of the forming chamber are provided in the bottom refractory liner. These openings 60 provide paths of communication to the coolers 59 located within the transverse openings 58.

In the embodiment of the invention illustrated in FIGS. 1 and 2, the forming chamber 15 is also provided with barriers 61 extending transversely across it and mounted on or in the refractory bottom liner 57. These barriers 61 may be characterized as dams and they may be inserted in slots and held down at their ends at each side of the forming chamber. They are preferably constructed of a material that is less dense than a molten metal in the forming chamber so that their vertical position may be varied upwardly or downwardly by controlled adjustment of their holddown devices connected at the ends of the dam and at the sides of the forming chamber.

The forming chamber 15 further comprises refractory side walls 63 and a refractory exit lip 65. These, along with the refractory bottom liner 57 and the threshold 31, define a container in which a pool of molten metal 66, preferably molten tin or an alloy of tin, is contained. In a preferred embodiment, extensions 67 are provided at the downstream or glass exit end of the bottom container portion of the forming chamber. These extensions serve as cavities into which dross floating on the surface of the molten metal 66 may be drawn for removal from the forming chamber.

The upper portion of the forming chamber includes an end wall liner 69, preferably constructed of refractory material. This liner 69 and the end casing 55 to which it is connected may include a suitable opening 70 through which a continuous sheet of glass may be withdrawn from the forming chamber along a substantially horizontal path, in the event that horizontal removal is desired.

The upper portion of the chamber also includes a lintel 71 at its upstream or glass inlet end. This lintel 79 may be used as a means for assisting in the support of the roof 39 of the delivery facility 13. The upper portion of the chamber 15 further includes a ceiling or roof 73. It is preferably constructed of refractory material and provides a suitable surface for radiating and absorbing heat uniformly over the area of the forming chamber facing it, which is the area of the forming chamber including the pool of molten metal 66 and glass supported on the pool of molten metal. Extending through the ceiling or roof 73 are controllable heating elements 75 used to control the rate of heat removal from the glass during forming. These heating elements 75 are connected to bus bars 77 which are connected, in turn, to a source of electric power (not shown).

The upper portion of the forming chamber illustrated in FIGS. 1 and 2, which is one possible embodiment of this invention, includes a top casing end wall 79 providing a space between the upper portion of the forming chamber 15 and the upstream or furnace side of a conveyor mechanism 17. During operation, a protective gas is directed into the forming and conveyer enclosure. This prevents oxidation of the molten metal in the forming chamber.

During operation, a delivered layer of molten glass 49 is advanced along the surface of the pool of molten metal 66 to form a continuous, dimensionally stable sheet or ribbon of glass 81. The glass is preferably delivered and formed in the manner described in U.S. Pat. No. 3,843,346, although, as will be described below, the delivery of glass may be in the manner as illustrated and described in U.S. Pat. Nos. 3,083,551 and 3,220,816.

Extending into the forming chamber through its side walls are glass edge contacting devices 83 for applying outward tractive forces to the layer of glass 49 during its advance along the surface of the pool of molten metal. These devices 83 are preferably driven wheels disposed and driven in a manner to supply opposing outward forces to the glass and to maintain its width during attenuation and to cause it to be attenuated to a desired thickness which may be different from that which would be attained by the glass if it were allowed to remain on the surface of the molten metal for sufficient time to come to equilibrium with it.

The vertical conveyor 17 comprises a machine casing 91 and thermally insulated machine walls 93. The machine walls 93 are preferably constructed of refractory material. Within the vertical conveyer there is a series of supporting rolls 95 for engaging the continuous sheet of glass 81 and for conveying it upwardly from the forming chamber. The machine rolls are operated in a coordinated manner and are used to apply sufficient tractive force to glass to convey it upwardly and to transmit tractive forces along the glass downwardly through the glass to the hot or more fluid glass within the advancing layer of glass 49 on the surface of the molten metal on the forming chamber.

Disposed across the internal space within the conveyer casing at several intervals along its length are seals 97 for retarding the flow of gases either upwardly or downwardly through the enclosed space surrounding the rolls 95. Extending through the walls of the enclosed conveyer are openings 99 through which cullet may be directed in the event the continuous sheet of glass is chipped or broken in an upper portion of the conveyor. A space is provided within the top casing of the forming chamber and the wall in the vertical conveyor for accommodating cullet removal. This space is characterized as a cullet chamber 101.

In a preferred embodiment of this invention, coolers 103 are disposed across the forming chamber in the vicinity of its downstream or exit end for controlling the removal of heat from the glass in the immediate vicinity of the location at which it is withdrawn from support by the pool of molten metal in the forming chamber. Coolers may be employed in this vicinity whether the glass is lifted and conveyed upwardly from the surface of the pool of molten metal or lifted slightly and conveyed substantially horizontally from the forming chamber.

Referring now specifically to FIG. 3, the details of the cooling arrangement employed in this apparatus may be appreciated. The refractory liner 57 is provided with transverse openings 58. Each opening 58 is sized to receive a cooler, such as a pipe cooler 59. An annular space exists around the cooler 59 inside the opening 58, and a slot-like opening 60 is provided in the liner transversely across a portion of its width to provide communication between the cooler 59 in its opening 58 and the space above the bottom liner 57 in which the pool of molten metal 66 resides. This permits a portion of metal from the pool of molten metal 66 to enter through the slot-like opening 60 into the annular space around the cooler 59 in its opening 58.

The width of the slot-like opening is defined by "W" in FIG. 3 and the depth of the opening is defined by "D". The depth is considered effectively to be the depth from the upper surface of the liner 57 to the cooler opening 58 at the upper part of the cooler 59. In general, the depth to the annular space and the depth to the cooler will be about equal as the annular space is preferably intended to be substantially less than the width or outside diameter of the cooler 59. In a typical forming chamber a pipe cooler 59 having an outside diameter on the order of one inch (2.54 cm) may be placed in an opening 58 having a diameter on the order from 1⅛ inch (2.86 cm) to 2 inches (5.08 cm). The slot width may be on the order from ⅛ inch (0.32 cm) to ⅜ inch (1.0 cm). It may be as large as 1½ inch (3.81 cm) in preferred embodiment of the invention. The depth of the slot opening may be on the order of 2 to 6 inches in such a preferred embodiment of the invention.

When practicing this invention with a bath employing a pool of molten tin, temperatures may be maintained within the annular space which are on the order of 450° to 500° F. (230° to 260° C.) (permitting the tin to be molten) or even at temperatures that are below 300° (150° C.) (at which the tin within the annular space about the cooler will be solidified). When practicing this invention, it appears possible to establish heat extraction on the order of from 50,000 to 120,000 BTU/hr (14.6 to 35.2 Kilowatts) per linear foot (30.5 cm) of pipe when providing a slot depth on the order of 2 inches (5.1 cm) with the molten tin having a surface temperature from 1,000° to 2,000° F. (540° to 1100° C.) and from 20,000 to 40,000 BTU/hr per linear foot (30.5 cm) of pipe when employing a slot opening depth on the order of 6 inches (15.2 cm), both being determined for a slot width on the order of ⅜ inch (1 cm). When employing a slot opening on the order of ⅛ inch (0.3 cm) for a one-inch cooler, slot depths exceeding 4 inches appear to be definitely less practical than slot depths on the order of 2 inches (5.1 cm) for which heat extraction rates on the order of 20,000 BTU/hr per linear foot (30.5 cm) of pipe (5.9 to 11.8 Kilowatts) are respectively forecast for corresponding top surface metal temperatures of 1,000° to 2,000° F. (540° to 1100° C.).

For a ⅜ inch (1 cm) width slot and a 1-inch cooler with a slot opening depth of only 2 inches (5.08 cm), the maximum temperature to be expected in the vicinity of the cooler will be in the range of 700° F. (370° C.) for a top surface metal temperature on the order of 2,000° F. (1100° C.) and about 400° F. (210° C.) for a top surface metal temperature of about 1,100° F. (550° C.). Correspondingly lower cooler surface temperatures will pevail for arrangements in which a greater slot is provided.

Figure 4:
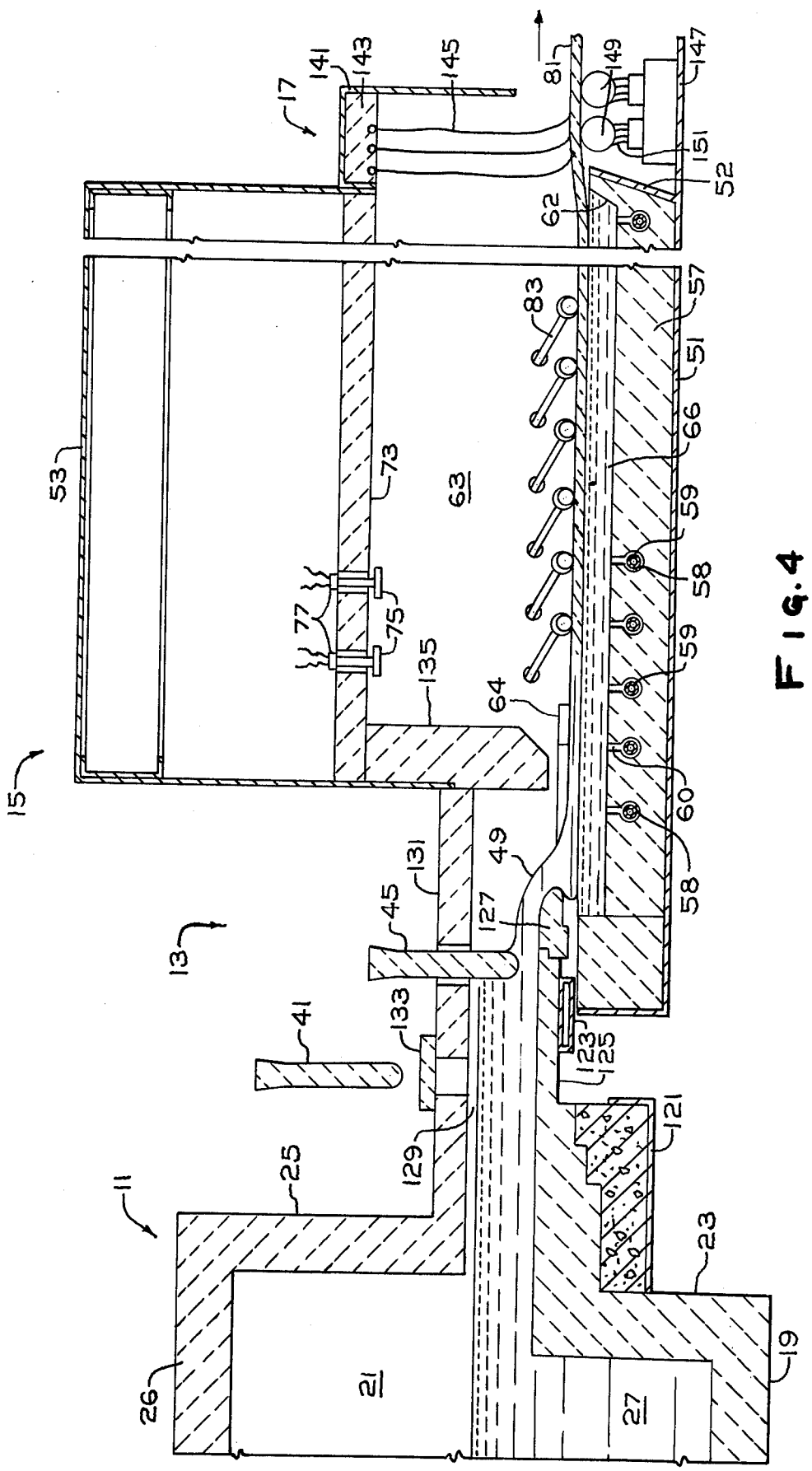
FIG. 4 is a longitudinal, sectional elevation view of another embodiment of the invention wherein a forming chamber of generally conventional length is provided with the benefits of this invention.

Referring now to FIG. 4 there is illustrated another embodiment of this invention. This embodiment of the invention is one in which the cooling arrangement is applied specifically to a glassmaking and forming facility of more usual dimensions as employed in conventional commercial practice. In this embodiment of the invention there is provided a glassmaking furnace terminating in a conditioner or refiner 11, the molten glass delivery facility 13, the glass forming chamber 15 and a facility 17 for removing finished ribbon or sheet of glass from the forming chamber 15. The glassmaking furnace includes a furnace bottom 19, side walls 21, a front basin wall 23, an upper front wall 25, and a roof or crown 26. A pool of molten metal 27 is maintained in the furnace 11 during operation. The glass forming chamber includes a bottom casing 51, an exit casing 52, an upper casing 53, which along with elements of the glass removal facility 17 serve to provide an enclosed forming chamber. Disposed within the lower portion of the forming chamber is a bottom liner 57 having transverse openings 58 for receiving coolers 59. The openings are connected by slot-like openings 60 to the upper portion of the liner. The liner is provided with a perimeter block which surrounds the upstream or glass inlet portion of the forming chamber and lower portion of its side. An exit lip 62 is provided at the glass exit or downstream end of the forming chamber and side walls 63 are also provided. Glass restraining or guide members 64 may be provided for restraining the outward movement of glass immediately after its delivery to the forming chamber. A system providing for a free fall and rearward spread of initially delivered molten glass is illustrated.

The forming chamber includes a pool of molten metal 66, a portion of which is in communication with the coolers 59 through the slot-like openings 60. A refractory roof or ceiling 73 is provided in the forming chamber separating it into a lower space, characterized as a headspace, and an upper space, characterized as a plenum or service space. Electric heaters 75 extend through the roof of ceiling 73 and are connected to bus bars 77 which are, in turn, connected to the source of electric power (not shown) for providing heat to the forming chamber headspace and for controlling the rate at which glass is cooled during its advance through the forming chamber.

The illustrated delivery facility includes a bottom canal casing 121 and cooler 123 supporting a canal bottom 125. Mounted at the downstream end of the canal bottom 125 is a lip 127 which overlies the inlet end of the forming chamber. Canal side walls 129 are also provided along with canal roof 131 overlying the canal in the portion of the inlet end of the forming chamber. A long lintel 135 joins the canal roof 131 to the upper portion of the inlet end of the forming chamber.

During operation, as in other embodiments already described, a layer of molten glass 49 is delivered from the pool of molten glass 27 in the furnace 11. In this instance the layer of molten glass 49 is delivered beneath the metering member 45 and over the lip 127 onto the pool of molten metal 66 in the forming chamber. As it advances along the pool of molten metal 66, it is cooled by heat transfer to its surroundings including heat transfer to the molten metal. Heat transfer to the molten metal is enhanced by heat transfer from the molten metal in communication with the coolers 59 through the slot openings 60. The glass is advanced and cooled to form a dimensionally stable, continuous sheet or ribbon of glass 81 which is then withdrawn from the pool of molten metal. During its advance the glass may be engaged by glass edge-engaging wheels 83 to maintain and control its width and thickness during forming.

The illustrated glass removal facility 17 includes an upper casing or canopy 141 which may have a refractory liner 143 and which supports several seals or drapes 145 which engage an upper surface of the glass 81 and provide for sealing the enclosed forming chamber against the ingress of air from the outside environment. The glass removal facility further includes a bottom case 147 having mounted within it conveyer rolls 149 for lifting and conveying glass 81 from the forming chamber. The rolls 149 may be provided with seals 151 to prevent the ingress of air into the forming chamber from beneath the ribbon or sheet of glass 81.

In this embodiment of the invention even though the glass forming chamber may be one of conventional length, the relative rate of cooling the glass from beneath is enhanced relative to the rate of cooling the glass from above. Since excessive glass cooling from above can cause thermally-induced distortion in the upper surface of glass being formed, it is considered beneficial to increase the rate of cooling from beneath by increasing the heat transfer from the glass through the molten metal to coolers embedded in the bottom liner of the forming chamber. Even though the glass is cooled relatively more rapidly from below, the likelihood of causing distortion due to more rapid cooling from below is now considered to be significantly less than the likelihood of causing distortion by increasing the rate of cooling from above. This is because the bottom surface of the glass benefits from the force of gravity acting upon the glass and forcing it against the pool of molten metal which inherently has sufficient flatness to prevent distortion from occurring due to its buoyant resistance against the glass.

While this invention has been described with reference to particularly preferred embodiments, it is not to be considered limited to those specific embodiments recognizing that those skilled in the art will appreciate variations from these embodiments which nevertheless fall within the scope of the invention as generally described here. It is to be considered as defined by the appended claims, rather than being limited by these specific embodiments.

I claim:

1. In an apparatus for forming flat glass comprising an enclosed forming chamber having a casing and a refractory liner containing a pool of glass-supporting molten metal and having at least one cooler extending through a portion of the refractory liner beneath a lower surface of the pool of molten metal for removing heat from the pool of molten metal, the improvement which comprises a refractory liner having an opening extending through a sufficient portion of it for providing communication between the pool of molten metal and the cooler with metal of the pool of molten metal substantially filling said opening and surrounding the portion of the cooler in communication with it.

2. The apparatus according to claim 1 wherein the metal surrounding the cooler is solid.

3. The apparatus according to claim 1 wherein said opening is an elongated slot extending transversely across the forming chamber and extending downwardly into communication with an elongated cooler, the width of the slot being from 0.05 to 1.5 times the width of the cooler and the depth of the slot from an inner surface of the refractory liner to the cooler being from 2 to 50 times the width of the slot.

4. In a method of forming flat glass wherein a layer of molten glass is delivered onto the surface of a pool of molten metal maintained in a refractory liner disposed in a casing, and wherein the layer of glass is advanced along the surface of the pool of molten metal while being cooled to form a continuous sheet of flat glass, at least a portion of the cooling being by heat transfer from the glass to the pool of molten metal and thence through a portion of the refractory liner to coolers in the refractory liner, the improvement which comprises transferring heat directly from the metal to a cooler in the liner at a location beneath a lower surface of the pool of molten metal by contacting the cooler with a portion of the metal through an opening in the refractory liner.

5. The method according to claim 4 wherein heat is removed from the metal in contact with the cooler at a rate sufficient to solidify the metal immediately adjacent the cooler and to provide for the metal to be completely fluid and molten at the bottom of the pool of molten metal adjacent the opening in the refractory liner.

6. The method according to claim 4 wherein the metal consists essentially of tin and heat is removed from the metal in contact with the cooler at a rate sufficient to maintain the temperature of the metal immediately surrounding the cooler within a range of from 450° F. to 500° F. (230° to 260° C.).

* * * * *